United States Patent [19]

Chang

[11] Patent Number: 5,550,837
[45] Date of Patent: Aug. 27, 1996

[54] ADAPTIVE DIFFERENTIAL PULSE CODE MODULATION SYSTEM WITH TRANSMISSION ERROR COMPENSATION

[75] Inventor: Hyokang Chang, Potomac, Md.

[73] Assignee: Telogy Networks, Inc., Gaithersburg, Md.

[21] Appl. No.: 248,143

[22] Filed: May 24, 1994

[51] Int. Cl.$^6$ .................................................. G06F 11/00
[52] U.S. Cl. .............................................. 371/5.5; 371/5.1
[58] Field of Search ........................... 371/5.5, 5.2, 5.1; 370/10, 27, 25, 22; 375/245, 240, 249

[56] References Cited

U.S. PATENT DOCUMENTS

| | | | |
|---|---|---|---|
| 4,088,876 | 5/1978 | Rege | 235/312 |
| 4,354,273 | 10/1982 | Araseki et al. | 375/27 |
| 4,481,629 | 11/1984 | Hatata et al. | 371/57 |
| 4,502,143 | 2/1985 | Kato et al. | 371/57 |
| 4,571,736 | 2/1986 | Agrawal et al. | 375/27 |
| 4,670,851 | 6/1987 | Murakami et al. | 364/518 |
| 4,747,112 | 5/1988 | Blondeau, Jr. et al. | 375/20 |
| 4,768,203 | 8/1988 | Ingle | 375/10 |
| 4,794,604 | 12/1988 | Gorshe | 371/57 |
| 4,853,931 | 8/1989 | Gorshe | 371/55 |
| 5,309,443 | 5/1994 | Schorman | 371/5.5 |

Primary Examiner—Hoa T. Nguyen
Assistant Examiner—Phung My Chung
Attorney, Agent, or Firm—Jon L. Roberts; Andrew M. Calderon; Roberts & Associates

[57] ABSTRACT

A codeword forcing technique is applied which provides gradual degradation of an audio output during fading such that analog degradation in a fading signal environment is simulated. The system may be used in conjunction with digital cordless telephones where gradual degradation of a 32 Kbit/s ADPCM signal is obtained by indirectly detecting a transmission bit error rate, The bit error rate detection is accomplished by sensing the occurrence of an invalid all-zero code, Codeword forcing techniques are then applied to compensate for the inaccurate transmission and associated noise level,

20 Claims, 6 Drawing Sheets

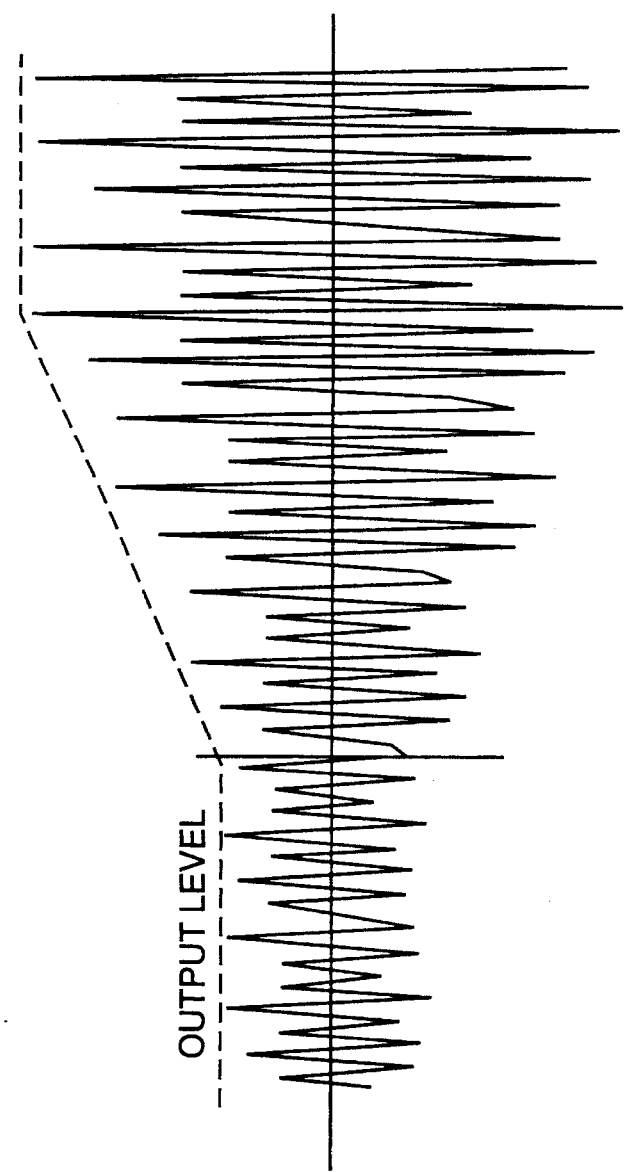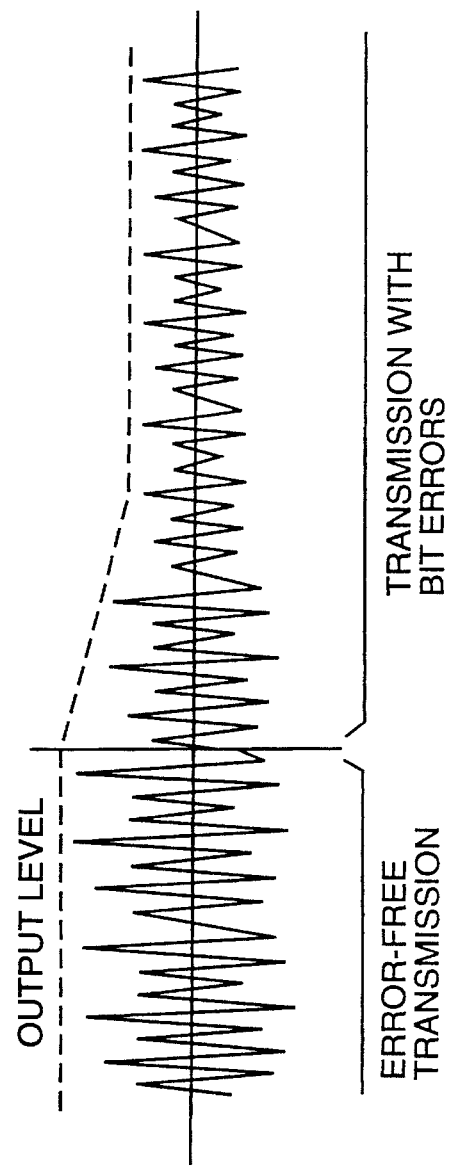

5,550,837

ADAPTIVE DIFFERENTIAL PULSE CODE MODULATION SYSTEM WITH TRANSMISSION ERROR COMPENSATION

FIELD OF THE INVENTION

The present invention relates generally to coding schemes for speech transmission over limited bandwidth digital links. In particular, the present invention relates to an improvement in an adaptive differential pulse code modulation ("ADPCM") system used in conjunction with such speech transmission.

BACKGROUND OF THE INVENTION

Adaptive differential pulse code modulation ("ADPCM") is well known and widely used for speech transmission over digital links with limited bandwidth because of its bandwidth efficiency. In particular, digital cordless telephone standards such as the CT-2 and DECT are based on 32 Kbps ADPCM speech coding.

Signal level tracking of the ADPCM signal is accomplished through the use of an adaptive quantizer that performs an automatic gain control function before quantization. At each sample of an input analog signal (for example, an RF signal), the adaptive quantizer updates the quantization step size in a recursive manner based on the previous output codeword, effectively adjusting the output level of the encoder. For example, in 4-bit ADPCM, the occurrence of output codeword +7 or −7 increases the step size for the next input sample substantially while the occurrence of codeword 0 reduces it moderately.

FIG. 1 shows a typical distribution of ADPCM codewords. With transmission bit errors, the codeword distribution at the receiver tends to flatten as indicated. That is, the bit errors tend to, on average, increase the magnitude of the codeword input at the receiver. As a result, there are more codewords that increase the quantizer step size at the receiver than there are at the transmitter, resulting in an overall output level increase.

ADPCM speech encoding provides many advantages for speech transmission. However, there are also deficiencies with such a coding scheme. For example, if fading of the digital radio links occurs, transmitted bits experience occasional high bit error rates as a result.

When such transmission bit errors occur, an ADPCM decoder not only introduces noise to the output, it also amplifies that noisy output. At bit error rates greater than five percent, the ADPCM output noise level is too high for normal listening. In order to overcome this problem, muting is normally applied to the ADPCM output whenever the RF signal strength falls below a certain threshold level, cutting off the ADPCM output entirely. The threshold level is chosen based on the likelihood of a bit error rate at the low level and the associated noise level at the output.

This approach, however, has several deficiencies. One of the shortcomings is the sudden signal dropout that occurs due to muting; a listener on the receive end suddenly gets no input. Another shortcoming is the lack of indication to the listener as to the link condition; when signal dropout is experienced, it is not known by the listener whether this is due to RF fading or due to some other problem, such as a hardware malfunction. A third shortcoming is the coarse nature of judging the link condition based solely on the signal strength. This method of noise reduction is actuated based solely on the input analog signal strength, when other characteristics should also be taken into consideration in evaluating the quality of the link. As the normal solution is currently implemented, it is possible to enable muting even if the link condition is acceptable. Further, such a solution does not compensate at the receive side if there is a high bit error rate and the input analog signal is of adequate strength, that is, if the bit error rate is unrelated to signal strength.

Several attempts have been made to rectify shortcomings in ADPCM speech encoding. For example, U.S. Pat. No. 4,354,273 to Araseki et al. discloses an ADPCM system for speech transmission. The coefficient of the synthesis filter in both the transmitter and the receiver of the Araseki system is varied in accordance with the normalized error rather than with the error itself, providing greater frequency band compression and preventing transmission errors from rendering the synthesis filter unstable.

U.S. Pat. No. 4,571,736 to Agrawal et al. discloses an ADPCM system which overcomes feedback interference introduced in the code by periodically not transmitting a percentage of speech data samples and instead replacing the samples by their estimates. The coding process then continues in a normal fashion. The estimate is established on the basis of autocorrelation statistics of the speech data samples. At the receiving end of the communication system, the replaced sample is estimated using the same process and is further estimated using delayed interpolation. This technique is useful in achieving gradual degradation on the data channel, but is most useful when the bit rate is 24 Kbps or less.

U.S. Pat. No. 4,088,876 to Rege discloses a recirculating memory circuit made of shift registers that may be accessed in parallel. The circuitry detects the occurrence of a series of ones or a series of zeros and relates such an occurrence to a high probability of an error in that shift register. The corresponding bits in the data segment being accessed can then be corrected by complementing the appropriate error bits.

U.S. Pat. No. 4,481,629 to Hatata et al. discloses an abnormal signal detecting device having a signal sampling and conversion circuit for sampling a number of data points along an analog signal and generating digital sampled data signals representative of the analog signals. The device also stores the sampled signal and compares consecutive samples. An output indicating an abnormal condition is generated whenever at least three consecutive digital samples are the same.

U.S. Pat. No. 4,502,143 to Kato et al. discloses an encoder which tests for consecutive bits having the same value. After a certain predetermined number of bits having the same value have been detected, a bit having the complement value is inserted into the bit stream in order to keep the average signal level constant. The encoder is useful for digital communication at a rate of higher than 100 Mbps.

U.S. Pat. No. 4,747,112 to Blondeau, Jr. et al. discloses a decoding method for T1 line zero bit suppression in which an encoded T1 line frame that has a number of bundled channels is received. Indicator bits of the received T1 line frame are tested to determine whether any channel of the frame has been altered for the transmission. If alteration is determined, the channels in the bundle that have been altered are isolated and the contents of each altered channel are replaced with all zeros and the T1 line frame is transferred for further processing.

U.S. Pat. No. 4,794,604 to Gorshe discloses a system for exploiting the characteristics of the Zero-Byte Time Slot Interchange (ZBTSI) algorithm by using the relationship of the data octet and adjacent octets to detect error conditions such as violations of the DS1 ones density criteria for detection of transmission channel errors in a ZBTSI decoder. This relationship is used as part of an optimized partial error correction technique to minimize error multiplication in the transmission channel.

U.S. Pat. No. 4,853,931 to Gorshe discloses a violating all-zero octet detector for a ZBTSI clear channel data transmission system. The input data are scanned for zero strings of data that could combine with an all-zero octet to violate the zero string criterion of the system.

None of the above references describes a system that effectively solves the problem of increased noise levels on a digital channel in a fading RF environment utilizing ADPCM encoding. Such a system should gradually degrade the ADPCM output as bit error rates increase, effectively keeping the received noise level in check. Such degradation of the signal should be based at least in part on an estimate of the bit error rate, rather than solely on the input RF signal level.

SUMMARY OF THE INVENTION

It is therefore an object of the present invention to provide a system that compensates for fading RF signal strength without sudden dropouts in the output speech signal.

It is a further object of the present invention to provide a system that does not preemptively compensate for increased output signal noise levels based solely on RF signal strength.

It is an additional object of the present invention to provide a system that enables a listener to determine some indication of the link condition in a fading RF environment.

It is also an object of the present invention to provide a system that compensates for a fading RF input signal based on an indirect estimate of the channel bit error rate.

It is another object of the present invention to provide a system that causes gradual output signal degradation during fading of radio signal strength.

It is still a further object of the present invention to provide a system that avoids degrading the output signal if the link condition is acceptable.

These and other objects and advantages of the present invention will be apparent to those of ordinary skill in the art upon inspection of the following description, drawings, and appended claims.

The present invention is a communications system utilizing ADPCM speech encoding techniques. The transmit side of the communications system accepts an analog input, such as a speech signal, and encodes the input using ADPCM techniques. The encoded output is transmitted to the receive side of the communications system, where the bit error rate of the transmission is estimated. The magnitude of the decoded output at the receive side is compensated according to the estimated bit error rate such that it follows the degradation of the fading analog input signal.

The technique utilized by the present invention includes estimating the actual channel bit error rate indirectly by checking the received codewords for invalid strings and applying "codeword forcing" as a function of the estimated bit error rate before transmitting such that the overall output level of the decoder decreases to a degree commensurate with the increase in the estimated bit error rate. Codeword forcing allows only a certain range of codewords to be accepted, so that amplified noise is avoided. The present invention provides for gradual degradation of the decoder output level so that sudden dropoffs are avoided.

BRIEF DESCRIPTION OF THE DRAWINGS

FIGS. 3a and 3b show the ADPCM output with transmission bit errors; FIG. 3a shows the output without code forcing and FIG. 3b shows the output with code forcing.

DETAILED DESCRIPTION OF THE INVENTION

Because 4-bit ADPCM utilizes only fifteen valid codewords out of sixteen possible codewords (−7 through +7), the one remaining codeword is invalid as a representation of the input signal. This invalid codeword is normally designated as the codeword 0000. Thus, a valid output from an ADPCM encoder will never be 0000. At the receive location, however, the invalid codeword may be present due to bit errors incurred during transmission.

The indirect estimation of bit error rate is performed by detecting occurrences of this invalid codeword. The probability of detecting a codeword having bit errors at the receive location when the channel becomes noisy by checking for the invalid codeword is relatively high because many candidate error-containing codewords may become the invalid codeword in a highly noisy environment. That is, many candidate codewords can be mapped into the invalid codeword. For example, assuming not more than a single bit error exists in a codeword, the candidates for the invalid codeword are 0001, 0010, 0100, and 1000. If any of these codewords is transmitted, single bit errors due to fading may result in the reception of a 0000. Likewise, if double bit errors exist, 0011, 0101, 0110, 1001, 1010, and 1100 are candidates to become invalid codewords, although such an occurrence is much less likely than the single bit error case. Overall, at a bit error rate of 5%, the probability that a bit error maps into the invalid codeword is about 0.5%.

Thus, detection of an invalid codeword at the receiver 0.5% of the time is an indication of a bit error rate of approximately 5%. The hardware implementation of the present invention can therefore include a lookup table to map the invalid codeword detection rate of 0.5% to a bit error rate of 5%. Other invalid codeword detection rates will be mapped to the respective bit error rates. In addition to or instead of a lookup table, microprocessor means or any other hardware logic means may be used to perform the necessary calculations or mapping.

In determining the invalid codeword detection rate, many methods may be used. For example, a sample period may specified, over which the number of detected invalid codewords is counted. The rate may then be used in the lookup table. In the preferred embodiment, the interval between invalid codeword detections is used. This interval, along with the known transmission data rate, allows an instantaneous estimated bit error rate to be determined for each detected invalid codeword. In this way, the codeword forcing circuitry can be continuously updated.

Figure 1:
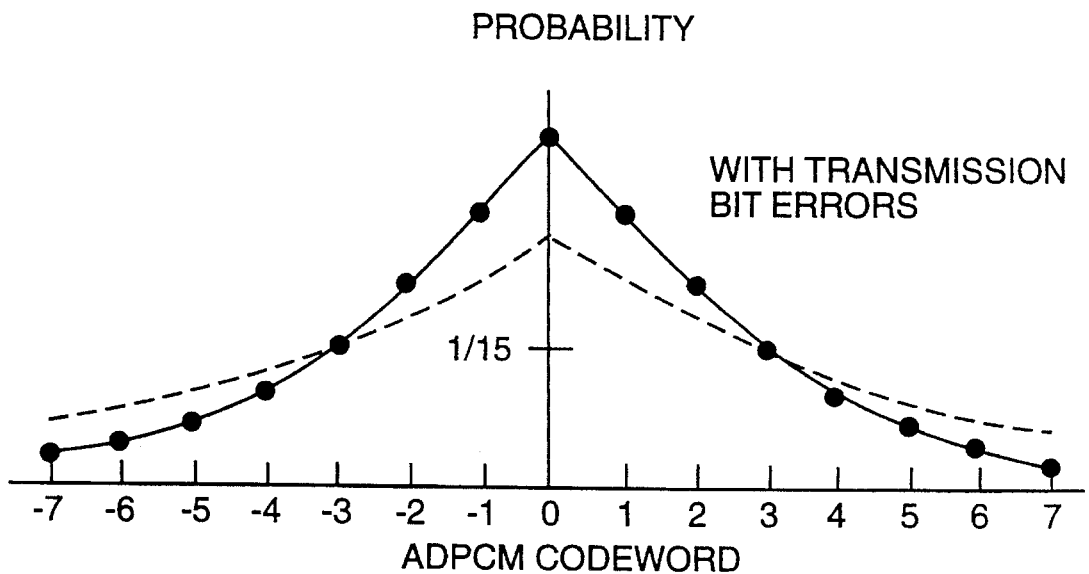
FIG. 1 shows a typical distribution of ADPCM codewords.

According to the present invention, codeword forcing is utilized in order to limit the received codewords within a certain range so as to constrain the growth of the output level of the ADPCM signal when transmission errors are detected. For example, at a bit error rate in the neighborhood of 1%, it may suffice to limit the codeword range within +/–6. That is, the codewords +7 and –7 are forced to +6 and –6, respectively. Thus, when the ADPCM coding technique calls for the maximum (+/–7) increase in step size in an environment which is experiencing a small estimated bit error rate, step size increase is slightly curtailed on the high end to prevent a large increase in the output noise level. Because bit errors tend to shift codewords from the middle toward the edges in a typical codeword distribution, as shown in FIG. 1, codeword forcing as provided by the present invention allows for filtering of errored codewords without detrimental effect. Therefore, as the bit error rate increases, the range of permissible codewords should be narrowed.

Figure 2:
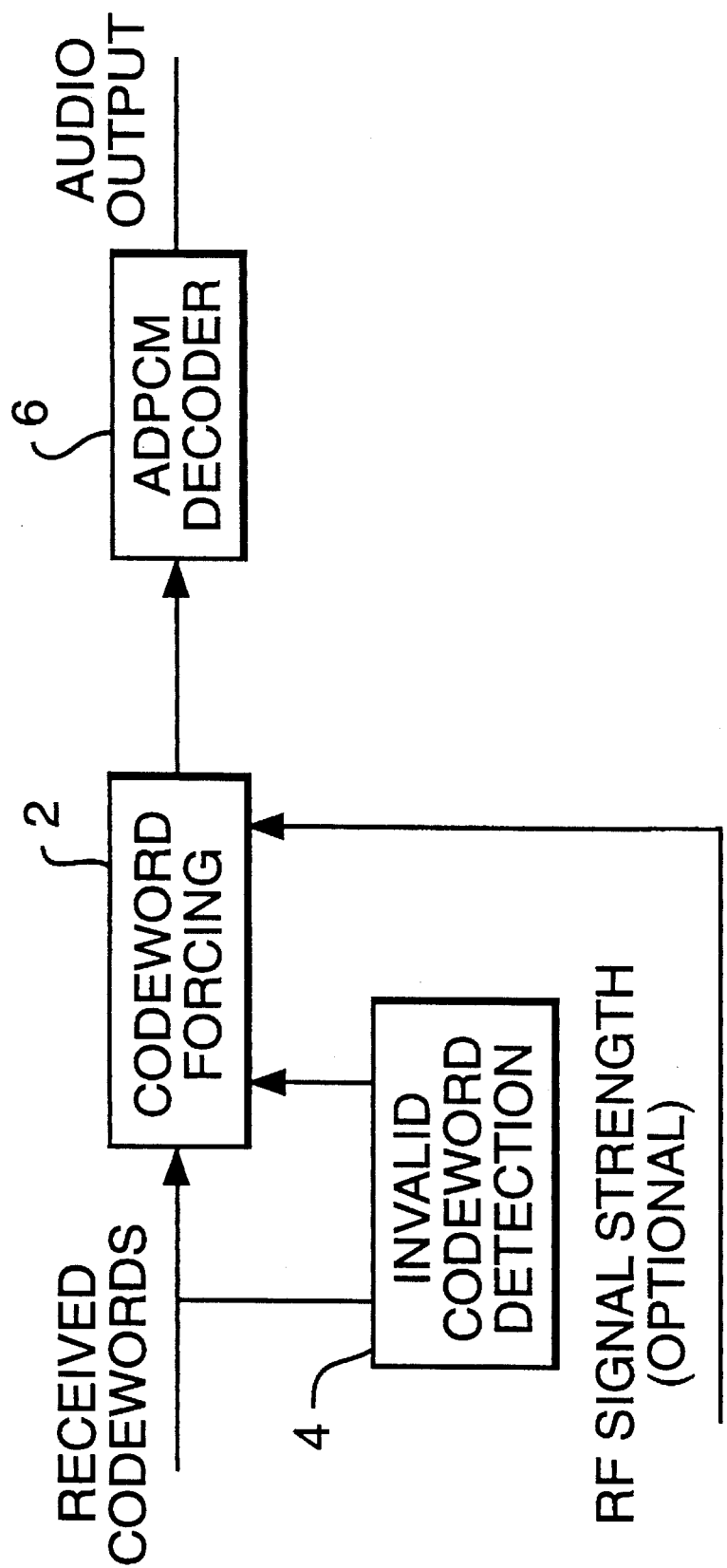
FIG. 2 shows a block diagram of the codeword forcing technique of the present invention.

Referring to FIG. 2, a block diagram of circuitry implementing the codeword forcing technique of the present invention is described. The compensation means connected to the input of the ADPCM decoder 6 at the input of the receiver includes codeword forcing circuitry 2 and invalid codeword detection circuitry 4. As shown, received codewords are provided as inputs to the codeword forcing circuitry 2 and the invalid codeword detection circuit 4. If the invalid codeword detection circuit 4 detects invalid codewords indicating a bit error rate below a certain threshold (for example, 1%), the received codeword will be passed to the ADPCM decoder 6 without undergoing the codeword forcing process. The ADPCM decoder 6 will then process the codewords and provide an audio output. If the invalid codeword detection circuit 4 detects invalid codewords indicating a bit error rate above a certain threshold (for example, 1%), the received codeword will be passed to the ADPCM decoder 6 only after undergoing the codeword forcing process. Multiple threshold levels may be specified, with permissible codeword range narrowing increasing as higher bit error rate thresholds are reached.

As shown, the RF signal strength may be provided as an input to the codeword forcing circuitry 2. A sudden dip in the RF signal level, indicating a high probability of resulting increased bit error rate, would cause immediate compensation by the codeword forcing circuitry, speeding recovery during times of drastic RF fading. Also, the level of codeword forcing performed by the codeword forcing circuitry 2 may be based on a combination of the estimated bit error rate and the RF signal strength. Thus, if the estimated bit error rate is fairly low but the RF signal strength is extremely low, the range of permissible codewords may be narrowed to a certain degree more than it would be based solely on the estimated bit error rate. A high estimated bit error rate with ample detected RF signal strength would indicate a problem other than a fading RF signal; this problem would be compensated for nonetheless.

Further, a sharp decrease in detected RF signal strength is a good indicator of subsequent transmission errors. Thus, if such a sharp decrease is detected, the codeword forcing circuitry 2 can compensate for the anticipated high bit error rate even before a high bit error rate is estimated. Basing the level of codeword forcing performed by the codeword forcing circuitry 2 on a combination of the estimated bit error rate and the RF signal strength therefore speeds the reaction time to drastic signal degradation while allowing gradual compensation when the signal is merely fading. A sharp dip in RF level can easily be detected by logic means in the codeword forcing circuitry 2 by sampling the signal at regular intervals and determining the different in amplitude from sample to sample. A difference threshold may be set up which is measured against the actual difference in adjacent sampled amplitude values. An amplitude change greater than the difference threshold can be used to trigger codeword forcing, overriding the estimated bit error rate determination. When the value falls back below the difference threshold, priority can be switched back to the estimated bit error rate determination.

One possible implementation of codeword forcing as a function of the bit error rate is as follows:

1) At bit error rates less than 1%, no codeword forcing is applied;
2) At bit error rates between 1% and 5%, the permissible range is limited to within +/–6, that is, the codewords +7 and –7 are forced to +6 and –6, respectively;
3) At bit error rates between 5% and 10%, the permissible range is limited to within +/–5, that is, the codewords greater than +5 are forced to +5 and the codewords less than 5 are forced to 5;
4) At bit error rates between 10% and 25%, the permissible range is limited to within +/–4; and
5) At bit error rates greater than 25%, the permissible range is limited to within +/–3.

Figure 4:
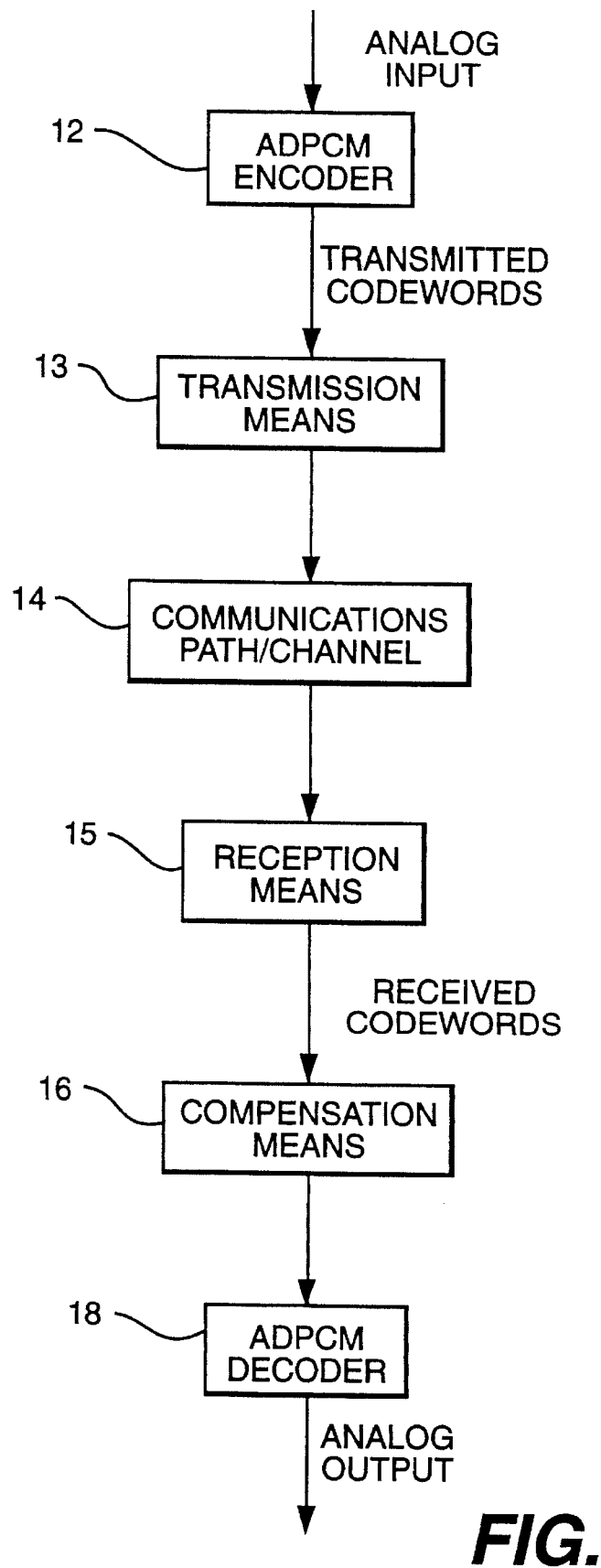
FIG. 4 shows an ADPCM communications system which compensates for transmission errors in accordance with the present invention.

FIG. 4 shows an overall exemplary ADPCM communications system which compensates for transmission errors in accordance with the present invention. The communications system includes a transmission component connected to a reception component via a communications path or channel. The transmission component comprises an ADPCM encoder 12 connected to a transmission means 13. ADPCM encoder 12 comprises an input for accepting an analog signal, and encodes the analog signal according to adaptive differential pulse code modulation techniques to generate an encoded output, which includes one or more transmitted codewords. Transmission means 13 are provided for transmitting the encoded output.

The reception component comprises a reception means 15 connected to a compensation means 16 and an ADPCM decoder 18. Reception means 15 receives the encoded output after it is transmitted over the communications path or channel. Compensation means 16 limits the range of the encoded output to generate a compensated output based on the encoded output. ADPCM decoder 18 decodes the compensated output according to adaptive differential pulse code modulation techniques, to generate an analog output.

Figure 5:
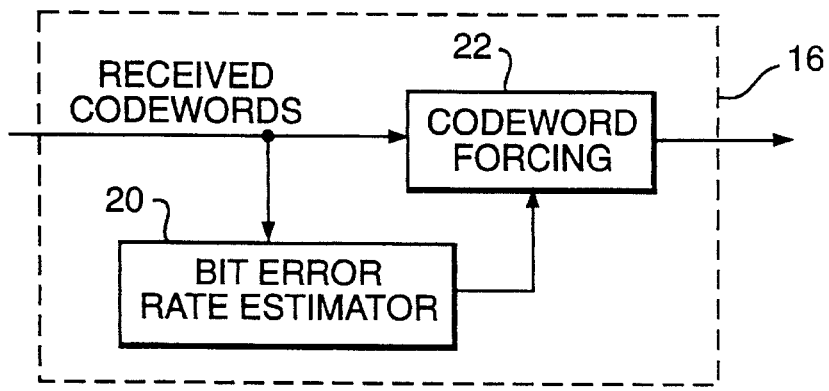
FIG. 5 shows a particular example of compensation means.

FIG. 5 shows a particular example of compensation means 16, comprising bit error rate estimator 20 and a codeword forcing circuit 22. Bit error rate estimator 20 estimates the bit error rate of the encoded output to generate an estimated bit error rate output. Codeword forcing circuit 22 accepts the estimated bit error rate output by estimator 20, and limits the amplitude range of the encoded output to generate a compensated output based on the encoded output and the estimated bit error rate output.

Figure 6:
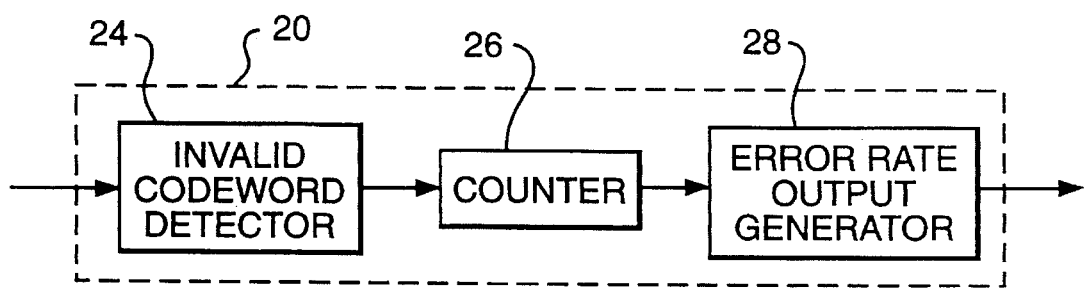
FIG. 6 shows a first embodiment of a bit error rate estimator in more detail.

FIG. 6 shows a first embodiment of a bit error rate estimator 20 in more detail. The illustrated bit error rate estimator 20 comprises an invalid codeword detector 24, a counter 26, and an error rate output generator 28. Invalid codeword detector 24 detects an invalid codeword in the encoded output and generates a count when the invalid codeword is detected. Counter 26 increments the count each time an invalid codeword is detected. Error rate output generator 28 generates an estimated bit error rate output based on the count of invalid codewords produced by counter 26.

Figure 7:
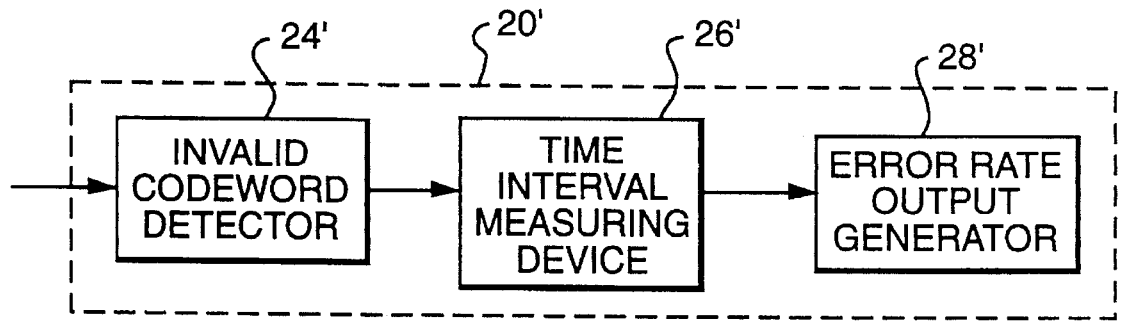
FIG. 7 shows a second embodiment of a bit error rate estimator in more detail.

FIG. 7 shows a second embodiment of a bit error rate estimator 20' in more detail. The illustrated bit error rate estimator 20' comprises an invalid codeword detector 24', a time interval measuring device 26', and an error rate output generator 28'. Invalid codeword detector 24' detects a first invalid codeword and a second invalid codeword in the encoded output. Time interval measuring device 26' measures a time interval between detection of the first invalid codeword and detection of the second invalid codeword. Error rate output generator 28' generates an estimated bit error rate output based on the time interval.

Figure 8:
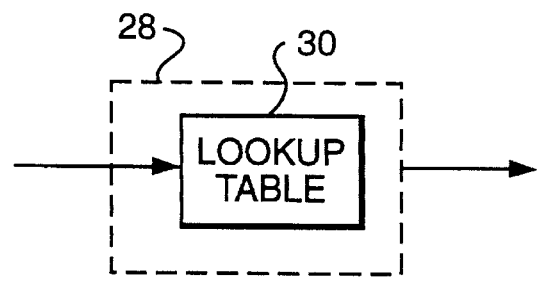
FIG. 8 shows a specific example of an error rate output generator.

FIG. 8 shows a specific example of an error rate output generator 28. Error rate output generator is shown as comprising a lookup table 30.

Figure 9:
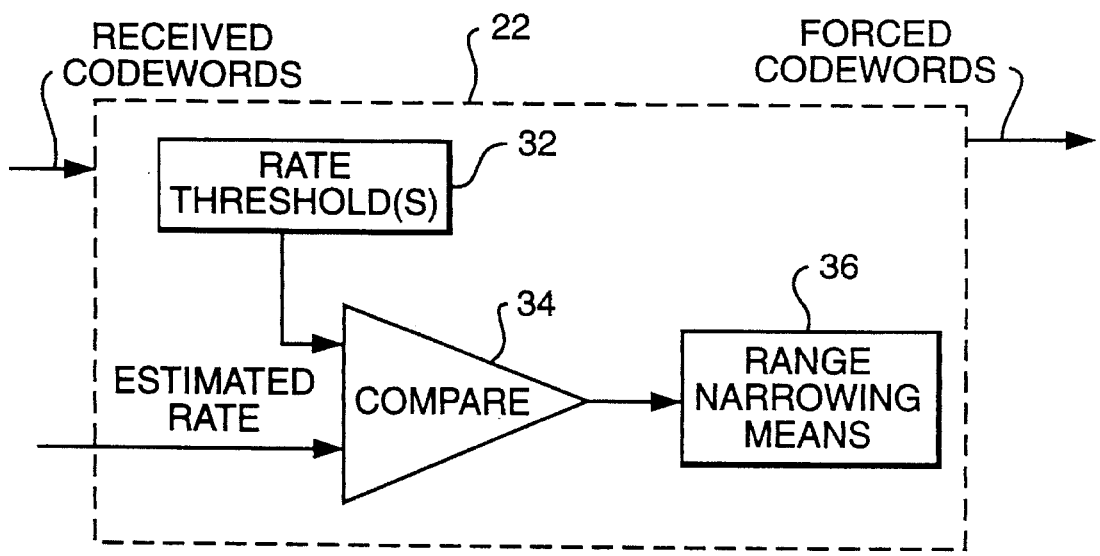
FIG. 9 shows a specific example of codeword forcing circuitry.

FIG. 9 shows a specific example of codeword forcing circuitry 22. The illustrated codeword forcing circuitry 22 comprises one or more bit error rate thresholds depicted as a block 32, and a comparing device 34 for comparing the estimated bit error rate output by bit error rate estimator 20 to each bit error rate threshold. Codeword forcing circuitry 22 also comprises range narrowing means for narrowing the range of amplitudes of the encoded output if an estimated bit error rate output is greater than a bit error rate threshold. If there are more than one bit error rate thresholds being compared, the range of amplitudes of the encoded output is narrowed to different degrees depending on which of the plurality of bit error rate thresholds the estimated bit error rate output exceeds.

The above examples are merely illustrations of example implementations of the present invention. Parameters such as threshold levels, range limits, and number of bits used by the ADPCM encoder may be modified to suit particular needs. The present invention is contemplated for use in many situations in which the values of these parameters may vary widely.

The effect of codeword forcing compared with no codeword forcing is depicted in FIG. 3. As shown in FIG. 3a, the output level grows to a degree that is significantly high when the bit error rate increases compared to the error-free transmission output level. As shown in FIG. 3b, the codeword forcing technique of the present invention causes a gradual degradation in the output signal as the bit error rate increases. Thus, a listener using an ADPCM system that does not use codeword forcing will experience an increase in output noise level which may make listening unbearable. A listener using the system of the present invention will experience a gradual drop in the overall output level, allowing normal listening to continue and indicating to the listener that the transmission is taking place in a fading RF environment.

The codeword forcing technique of the present invention is very effective in controlling ADPCM output levels while providing speech continuity as well as link quality indication to the listener in a fading digital radio environment.

Preferred and alternate embodiments have now been described in detail. It is to be noted, however, that this description is merely illustrative of the principles underlying the inventive concept. It is therefore contemplated that various modifications of the disclosed embodiment will, without departing from the spirit and scope of the present invention, be apparent to those of ordinary skill in the art.

I claim:

1. A communications system that compensates for transmission errors, comprising:

A) input means for accepting an analog signal;
   B) encoding means, connected to the input means, for encoding the analog signal according to adaptive differential pulse code modulation techniques to generate an encoded output, the encoded output comprising at least one codeword; and
   C) compensation means, connected for communication with the encoding means, for accepting the encoded output and for limiting a range of amplitudes of the encoded output to generate a compensated output based on the encoded output.

2. The communications system of claim 1, wherein the compensation means comprises:

A) bit error rate estimation means, connected for communication with the encoding means, for accepting the encoded output and estimating a bit error rate of the encoded output to generate an estimated bit error rate output; and
   B) codeword forcing means, connected to the encoding means and the bit error rate estimation means, for accepting the encoded output and the estimated bit error rate output and for limiting a range of amplitudes of the encoded output to generate the compensated output based on the encoded output and the estimated bit error rate output.

3. The communications system of claim 2, wherein the bit error rate estimation means comprises:

A) invalid codeword detection means for detecting an invalid codeword in the encoded output and for generating a count when the invalid codeword is detected;
   B) counting means for incrementing the count each time an invalid codeword is detected; and
   C) means for generating the estimated bit error rate output based on the count of invalid codewords.

4. The communication system of claim 3, wherein the means for generating the estimated bit error rate output comprises a lookup table.

5. The communications system of claim 3, wherein the codeword forcing means comprises:

A) a bit error rate threshold;
   B) means for comparing the estimated bit error rate output to the bit error rate threshold; and
   C) means for narrowing a range of amplitudes of the encoded output if the estimated bit error rate output is greater than the bit error rate threshold.

6. The communications system of claim 3, wherein the codeword forcing means comprises:

A) a plurality of bit error rate thresholds;
   B) means for comparing the estimated bit error rate output to each of the plurality of bit error rate thresholds; and
   C) means for narrowing a range of amplitudes of the encoded output if the estimated bit error rate output exceeds any of the plurality of bit error rate thresholds, such that the range of the encoded output is narrowed to different degrees depending on which of the plurality of bit error rate thresholds the estimated bit error rate output exceeds.

7. The communications system of claim 3, wherein:

A) each said codeword of the encoded output is a binary number having a plurality of bits; and
   B) the invalid codeword is a binary number having a plurality of bits, each said bit being zero.

8. The communications system of claim 2, wherein the bit error rate estimation means comprises:
   A) invalid codeword detection means for detecting a first invalid codeword and a second invalid codeword in the encoded output;
   B) interval measuring means for measuring a time interval between detection of the first invalid codeword and detection of the second invalid codeword; and
   C) means for generating the estimated bit error rate output based on the time interval.

9. A process for compensating for transmission errors in a communications system, comprising the following steps:
   A) receiving an analog signal;
   B) converting the analog signal to a digital signal by performing adaptive differential pulse code modulation on the analog signal;
   C) transmitting the digital signal in the form of at least one codeword;
   D) estimating a bit error rate of the transmitted digital signal;
   E) comparing the estimated bit error rate of the transmitted digital signal to a threshold value;
   F) narrowing a range of amplitudes of the transmitted digital signal if the estimated bit error rate is greater than the threshold value; and
   G) performing adaptive differential pulse code modulation decoding on the transmitted digital signal.

10. The process of claim 9, wherein the step of estimating the bit error rate of the transmitted digital signal further comprises the steps of:
   A) detecting an invalid codeword in the digital signal;
   B) generating a count when the invalid codeword is detected;
   C) incrementing the count each time an invalid codeword is detected; and
   D) generating the estimated bit error rate based on the count of invalid codewords.

11. The process of claim 9, wherein the step of estimating the bit error rate of the transmitted digital signal further comprises the steps of:
   A) detecting a first invalid codeword and a second invalid codeword in the digital signal;
   B) measuring a time interval between detection of the first invalid codeword and detection of the second invalid codeword; and
   C) generating the estimated bit error rate based on the time interval.

12. The process of claim 11, wherein the step of generating the estimated bit error rate based on the time interval includes the steps of:
   A) providing the time interval value to a lookup table;
   B) determining an estimated bit error rate corresponding to the time interval value in the lookup table; and
   C) generating the estimated bit error rate.

13. A communications system that compensates for transmission errors, comprising:
   A) input means for accepting an analog signal;
   B) encoding means, connected to the input means, for encoding the analog signal according to adaptive differential pulse code modulation techniques to generate an encoded output, the encoded output comprising at least one codeword;
   C) transmission means, connected to the encoding means, for transmitting the encoded output;
   D) a communications channel, connected to the transmission means;
   E) reception means, connected to the communications channel, for receiving the encoded output;
   F) compensation means, connected to the reception means, for limiting a range of amplitudes of the encoded output to generate a compensated output based on the encoded output; and
   G) decoding means, connected to the compensation means, for decoding the compensated output according to adaptive differential pulse code modulation techniques, to generate an analog output.

14. The communications system of claim 13, wherein the compensation means comprises:
   A) bit error rate estimation means for estimating a bit error rate of the encoded output to generate an estimated bit error rate output; and
   B) codeword forcing means, connected to the bit error rate estimation means, for accepting the estimated bit error rate output and for limiting a range of amplitudes of the encoded output to generate the compensated output based on the encoded output and the estimated bit error rate output.

15. The communications system of claim 14, wherein the bit error rate estimation means comprises:
   A) invalid codeword detection means for detecting an invalid codeword in the encoded output and for generating a count when the invalid codeword is detected;
   B) counting means for incrementing the count each time an invalid codeword is detected; and
   C) means for generating the estimated bit error rate output based on the count of invalid codewords.

16. The communication system of claim 15, wherein the means for generating the estimated bit error rate output comprises a lookup table.

17. The communications system of claim 15, wherein the codeword forcing means comprises:
   A) a bit error rate threshold;
   B) means for comparing the estimated bit error rate output to the bit error rate threshold; and
   C) means for narrowing a range of amplitudes of the encoded output if the estimated bit error rate output is greater than the bit error rate threshold.

18. The communications system of claim 15, wherein the codeword forcing means comprises:
   A) a plurality of bit error rate thresholds;
   B) means for comparing the estimated bit error rate output to each of the plurality of bit error rate thresholds; and
   C) means for narrowing the range of the encoded output if the estimated bit error rate output exceeds any of the plurality of bit error rate thresholds, such that the range of amplitudes of the encoded output is narrowed to different degrees depending on which of the plurality of bit error rate thresholds the estimated bit error rate output exceeds.

19. The communications system of claim 15, wherein:

A) each said codeword of the encoded output is a binary number having a plurality of bits; and B) the invalid codeword is a binary number having a plurality of bits, each said bit being zero.

20. The communications system of claim 14, wherein the bit error rate estimation means comprises:

A) invalid codeword detection means for detecting a first invalid codeword and a second invalid codeword in the encoded output;

B) interval measuring means for measuring a time interval between detection of the first invalid codeword and detection of the second invalid codeword; and C) means for generating the estimated bit error rate output based on the time interval.

* * * * *